UNITED STATES PATENT OFFICE.

CHARLES G. ALTON, OF HARTWELL, OHIO.

COMPOSITION OF MATTER FOR MAKING BRIQUETS OF FRAGMENTS OF METAL.

1,075,135.   Specification of Letters Patent.   Patented Oct. 7, 1913.

No Drawing.   Application filed March 8, 1912.   Serial No. 682,537.

*To all whom it may concern:*

Be it known that I, CHARLES G. ALTON, a citizen of the United States, residing at Hartwell, in the county of Hamilton and State of Ohio, have invented new and useful Improvements in Compositions of Matter for Making Briquets of Fragments of Metal, of which the following is a specification.

My invention consists in a composition of matter for making briquets, suitable for use in a melting furnace, of fragments of metal, iron borings, steel turnings, and the like.

In remelting loose iron borings, the loss from oxidation would be very great, and sulfur would be absorbed from the fuel. To overcome this difficulty, loose borings have been coated with clay or other relatively fire proof material, but the results of all such experiments have been below the standard of commercial requirements. Borings have been formed into briquets simply by pressure or by the use of various binders. The purpose of briqueting of any kind is to prevent loss from oxidation and infusion of sulfur in the furnace, and also to put the borings into reasonably convenient condition for handling.

A perfect briquet must have the following qualities: First: Such resistance against mechanical influences as will enable them to stand all necessary handling without disintegration. Second: They must not be disintegrated by temperatures below the melting point of the iron; that is, they must not crumble under heat, but must melt from the outside like a piece of pig iron. Third: They should be sufficiently impervious to moisture to prevent softening and crumbling and to exclude water and air that would cause oxidation. Fourth: They must be so dense in construction that the gases from the fuel will not penetrate them and permit the melting iron to absorb the sulfur. Fifth: Whatever is done to form the briquet, it is essential to avoid the introduction of anything that will be injurious to the iron for commercial purposes. My invention is a composition of matter that provides all of these requisites, and consists of a mixture of borings, Portland cement, hydrated lime and sand. The sand may be replaced by coke dust, or part sand and part coke dust may be used. The Portland cement is a cementing agent. The hydrated lime is also a cementing agent, and as is well known, intensifies the cementing action of the Portland cement, and being finer than the cement fills interstices that would otherwise be left open. The borings having been through the cupola before, have absorbed sulfur, and also have more or less oxid of iron and other impurities, and the hydrated lime as a flux causes the sulfur and other impurities to pass into the slag, and thus relieve the iron of these deleterious materials. When sand is used, it is preferably clean, sharp and high in silica. Both the sand and the coke dust are angular sided fillers, and make a stronger bond than could be made without something for that general purpose. The quantity of Portland cement, hydrated lime and sand or coke dust, or coke dust and sand mixed, will depend upon the size of the borings, but I have found that for average borings, 200 lbs. of the Portland cement, 40 lbs. of hydrated lime, and 60 lbs. of sand or 20 lbs. of coke dust mixed together; and 4 lbs. of this mixture used with 96 lbs. of borings, when the briquets are to be melted in an air furnace; and 6 lbs. of the mixture to 94 lbs. of borings, when the briquets are to be melted in an ordinary cupola, give results that meet all requirements. While I have found these proportions most advantageous, yet I do not limit myself to them, but they may be varied somewhat.

My invention is reduced to practice as follows: The mixture of borings, Portland cement, hydrated lime and sand or equivalent, is made in the proportions indicated, or modified as desired, for the reasons above stated, and sufficient water is added to thoroughly wet the whole mass. The mixture is then rammed into a mold of suitable size and shape, either by hand or with mechanical power. I have found that if correctly wetted, when thoroughly rammed, a little of the water will ooze from the mold. Briquets should be removed from the mold and allowed to dry thoroughly when they will have all the qualities above described. They should not of course be used for remelting until entirely dry.

I have found that briquets weighing from 60 to 100 lbs. are convenient for handling and in every way most desirable for furnace use.

I claim as my invention and desire to secure by Letters Patent of the United States:—

1. A composition of matter consisting of fragments of metal, Portland cement, hydrated lime, and a filler.

2. A composition of matter consisting of fragments of ferruginous metal, Portland cement, hydrated lime and a sharp filler.

3. A composition of matter consisting of iron borings, Portland cement, hydrated lime and an angular sided filler.

4. A composition of matter for briqueting composed of iron borings, Portland cement, hydrated lime and sand.

5. A composition of matter for making briquets, consisting of approximately iron borings 95%, and 5% of a binder made of two-thirds Portland cement, two-fifteenths hydrated lime, and one-fifth sharp sand, all proportions determined by weight.

In testimony whereof I have hereunto set my hand in presence of two subscribing witnesses.

CHARLES G. ALTON.

Witnesses:
 WALTER A. KNIGHT,
 ALICE L. TILDESLEY.